(12) United States Patent
Sugahara

(10) Patent No.: US 7,069,292 B2
(45) Date of Patent: Jun. 27, 2006

(54) AUTOMATIC DISPLAY METHOD AND APPARATUS FOR UPDATE INFORMATION, AND MEDIUM STORING PROGRAM FOR THE METHOD

(75) Inventor: Yasuo Sugahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 718 days.

(21) Appl. No.: 09/764,353

(22) Filed: Jan. 19, 2001

(65) Prior Publication Data

US 2002/0026529 A1 Feb. 28, 2002

(30) Foreign Application Priority Data

Aug. 29, 2000 (JP) ............... 2000-258571

(51) Int. Cl.
*G06F 15/16* (2006.01)
(52) U.S. Cl. .......................... 709/203; 707/3
(58) Field of Classification Search ................ 709/224, 709/228, 203; 707/10, 104, 3; 714/799; 715/501
See application file for complete search history.

(56) References Cited

U.S. PATENT DOCUMENTS

| | | | |
|---|---|---|---|
| 5,388,255 A | 2/1995 | Pytlik et al. | |
| 5,860,071 A | 1/1999 | Ball et al. | |
| 5,898,836 A | 4/1999 | Freivald et al. | |
| 5,961,601 A | 10/1999 | Iyengar | |
| 6,055,570 A * | 4/2000 | Nielsen | 709/224 |
| 6,088,707 A * | 7/2000 | Bates et al. | 715/501.1 |
| 6,094,662 A * | 7/2000 | Hawes | 707/104.1 |
| 6,219,818 B1 * | 4/2001 | Freivald et al. | 714/799 |
| 6,393,479 B1 * | 5/2002 | Glommen et al. | 709/224 |
| 6,591,266 B1 * | 7/2003 | Li et al. | 707/10 |
| 6,701,368 B1 * | 3/2004 | Chennapragada et al. | 709/228 |
| 6,801,906 B1 * | 10/2004 | Bates et al. | 707/3 |
| 6,826,594 B1 * | 11/2004 | Pettersen | 709/203 |

FOREIGN PATENT DOCUMENTS

| | | |
|---|---|---|
| EP | 0 812 088 | 12/1997 |
| EP | 0 837 407 | 4/1998 |
| JP | 10-97483 | 4/1998 |
| JP | 11-296428 | 10/1999 |

OTHER PUBLICATIONS

"Change Tagging in Internet Documents" IBM Technical Disclosure Bulletin, IBM COPR. New York, US, vol. 40, No. 12, Dec. 1, 1997, p. 153 XP000754123. ISSN: 0018-8689.

* cited by examiner

*Primary Examiner*—John Follansbee
*Assistant Examiner*—Dustin Nguyen
(74) *Attorney, Agent, or Firm*—Staas & Halsey LLP

(57) ABSTRACT

A method and an apparatus are provided that is capable of displaying existence of update information that is optimal to a client terminal for each piece of individual information when information accumulated in a server is browsed by the client terminal in the Internet or the like. Determination on which piece of the individual information has already been read (seen) information in the terminal is made possible by causing each piece of the information to have individual update information as server side document information and comparing the update information with update information in the client terminal side. By adding and returning a display attribute indicating unread (unseen) to the individual information for each client terminal based on determination results, individual update information that is not unified for each client terminal can be easily grasped.

21 Claims, 7 Drawing Sheets

AUTOMATIC DISPLAY METHOD AND APPARATUS FOR UPDATE INFORMATION, AND MEDIUM STORING PROGRAM FOR THE METHOD

BACKGROUND OF THE INVENTION

1. Field of the Invention

The present invention relates to a technology that is effectively applied when information accumulated in a server is browsed by a terminal apparatus in a network such as the Internet.

2. Description of the Related Art

In the internet, information accumulated in a Web server is browsed via the network by a browsing terminal apparatus in which a browsing program is started up.

Since information provided on the Web server is often partly updated, if new information is registered in the Web server, a tag for displaying a logo such as "NEW!!" indicating that the information is new, for example, a format "<IMG SRC=new.gif>", is inserted in a part that is updated anew.

On the other hand, a function for accumulating individual information for each terminal such as log information called cache or Cookie is provided in a program called Internet Explorer of Microsoft Corporation or Netscape of Netscape Communications Corporation that is frequently used as a browsing program. The browsing program can be provided with a function for, when specific information is browsed by accessing a Web server, downloading the specific information to a terminal apparatus only when the specific information is updated in the Web server side by comparing the specific information and Cookie information accumulated in the terminal apparatus, and determining whether or not the information is updated since the previous access in the terminal apparatus.

SUMMARY OF THE INVENTION

However, since information updated by an information provider on a Web server is provided in a uniform and fixed format to an unspecified number of browsers, a log indicating that the information is new is uniformly displayed until a source file in the Web server is updated in the information provider side.

Therefore, when a browser browses information of the Web server, it is unclear whether or not each piece of information is actually new for the browsing terminal.

In addition, in the technology using the above-mentioned cache or Cookie, although it is possible to find whether or not information in the Web server has been updated after the previous browsing compared with individual information that is accumulated in the browsing terminal, it is impossible to find which part of the information has been updated. Therefore, there is no way after all but to use a tag displayed as a logo and the like given by the information provider, which indicates that the information is new, as a clue in order to find which part of the information has been updated.

The present invention has been devised in view of the above-mentioned points, and it is a technical subject of the present invention to realize a technology that is capable of specifying and displaying on each terminal apparatus a part of information provided by a Web server that is new to the terminal apparatus by only adding a simple program to the Web server or a proxy server.

In order to solve the above-mentioned problem, according to the present invention, an information transmission request including an address and terminal update information (Cookie information) from a client terminal is received, server side document information including individual update information (a date and time or a date of update) for each piece of individual information is read out, and at the same time, individual information that is updated after the terminal update information is extracted by comparing the terminal update information and the individual update information and a display attribute is added to the extracted individual information. Then, the individual information is edited as document information for display (a general-purpose HTML file) and is returned to the client terminal.

In this way, according to the present invention, it is possible to determine which piece of the individual information is the one already read (already browsed) information in the terminal by causing each piece of information to have individual update information as server side document information and comparing the update information with the update information in the client terminal side. Individual update information that is different for each client terminal can be easily grasped by adding and returning to each client terminal a display attribute indicating that individual information has not been read (has not browsed) to individual information based on determination results.

According to the present invention, it is possible to individually specify and display a part of new information provided from the Web server for each individual client terminal, and update information is easily grasped for each client terminal.

DETAILED DESCRIPTION OF THE PREFERRED EMBODIMENTS

An embodiment of the present invention will be hereinafter described with reference to the drawings.

Figure 1:
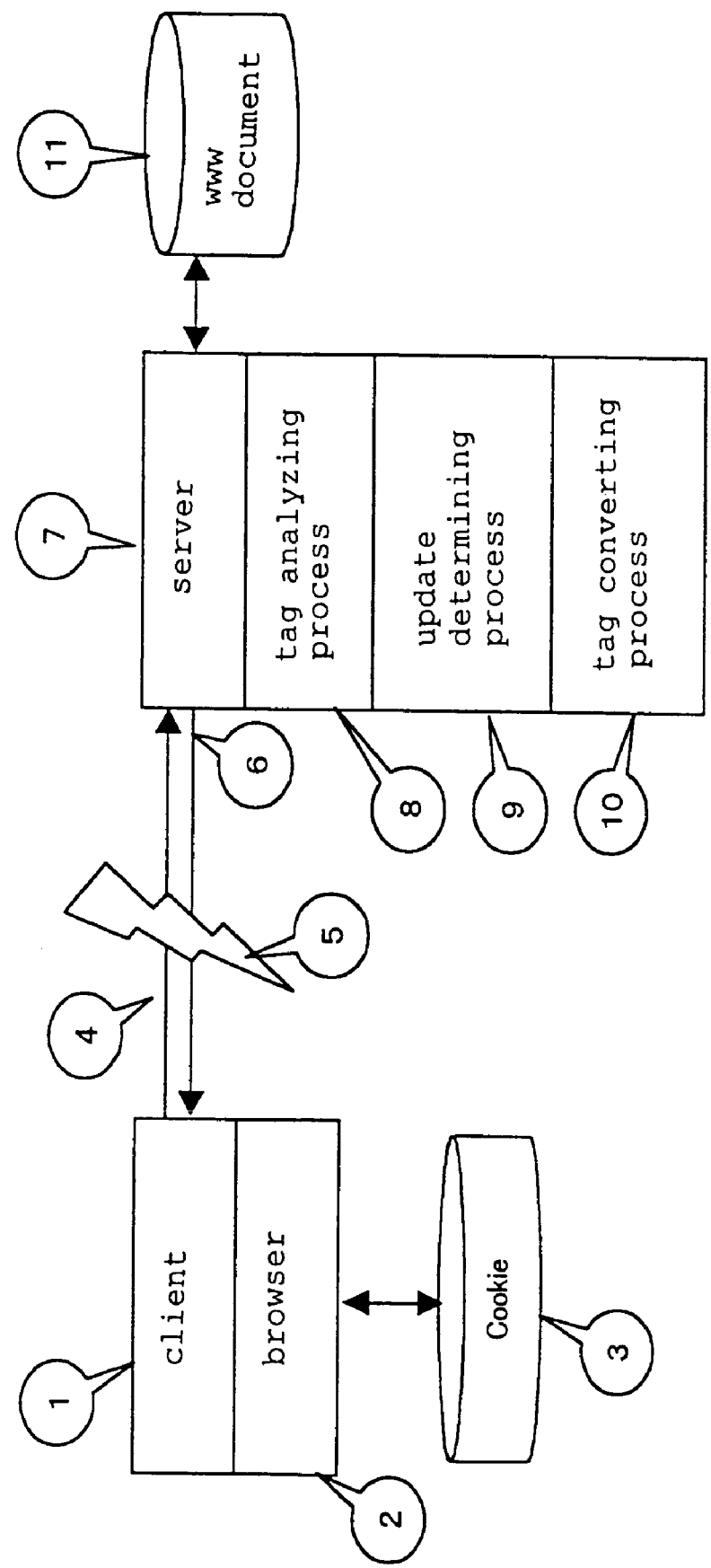
FIG. 1 is a diagram illustrating a system configuration in an embodiment of the present invention.

FIG. 1 is a diagram illustrating a system configuration for realizing the present invention.

In FIG. 1, reference numeral 1 denotes a client terminal (an information browsing terminal) which is composed of a personal computer, a terminal apparatus exclusively used for browsing the Internet, a portable information terminal or the like.

Windows of Microsoft Corporation, UNIX, LINUX or the like is installed in the client terminal 1 as an operating system. A browser program 2 (a browsing program) such as Internet Explorer of Microsoft Corporation and Netscape of Netscape Communications Corporation is installed in these operating systems.

The browser program 2 has an individual information accumulating function (a Cookie function: Cookie) for each client terminal 1, and a region (a Cookie region 3) for accumulating the individual information (Cookie information).

Further, in this embodiment, the browser program 2 in the client terminal 1 is general-purpose as described above, and may be any browser program as long as it is provided with the Cookie function.

The client terminal 1 is connected to information communication channel 5 such as the Internet, and is made available to access a Web server 7.

The Web server 7 is composed of a general-purpose computer system, includes a central processing unit, a storage apparatus, an input/output apparatus and the like that are connected to each other by an internal bus, and functions as a server processing apparatus (not shown). The server processing apparatus has a function, when receiving an information transmission request 4 specifying an address (URL: Uniform Resource Locator) from the client terminal 1 via the information communication channel 5, to transmit a WWW document information 11 stored in the address from its document database as a return information 6. The function is specifically realized by a server program installed in a hard disc device.

The WWW document information 11 being source side document information is a text written in HTML file (Hyper Text Mark-up Language). However, an extension tag is inserted in the WWW document information 11, and an update date or an update date and time is recorded for each piece of information. More specifically, a description such as "update=20000524" is inserted as update information in each piece of information.

In this embodiment, a tag analysis program 8, an update determination program 9 and a tag conversion program 10 are installed in the Web server 7, which is made available to process the WWW document information 11 and return the processed information to the client terminal 1.

Functions of each program 8, 9 and 10 will be hereinafter described.

The client terminal 1 issues the information transmission request 4 to the Web server 7 via the information communication channel 5. Upon issuing the information transmission request 4, a URL indicating a specific address of the Web server 7 and the Cookie information stored in the Cookie region 3 of the client terminal 1 are added to the request.

The Cookie information is, for example, access information (an access date and time record of the previous access) of the URL accumulated in the Cookie region 3. Further, when Cookie information corresponding to the URL does not exist in the Cookie region 3, the client terminal 1 does not have to add the Cookie information to the information transmission request 4.

Figure 2:
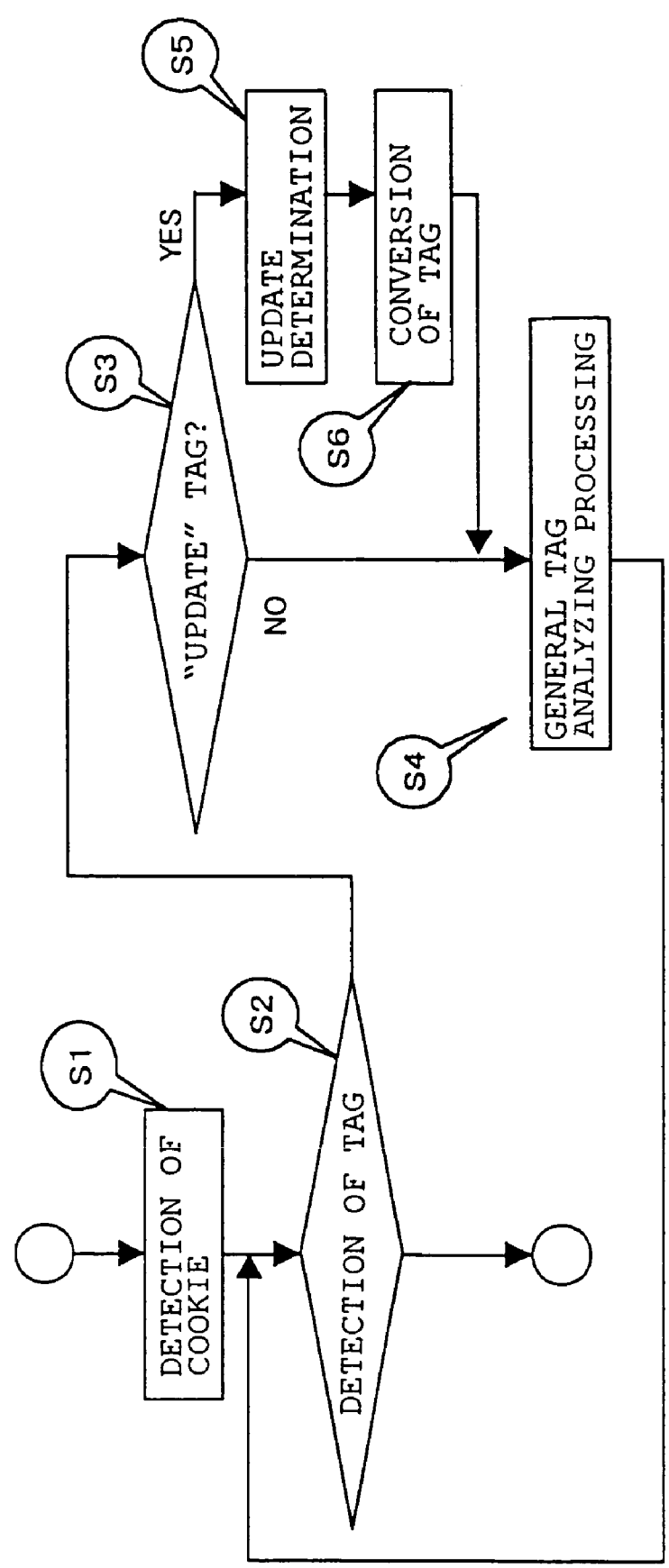
FIG. 2 is a processing flow diagram of a tag analysis program in the embodiment.
Figure 3:
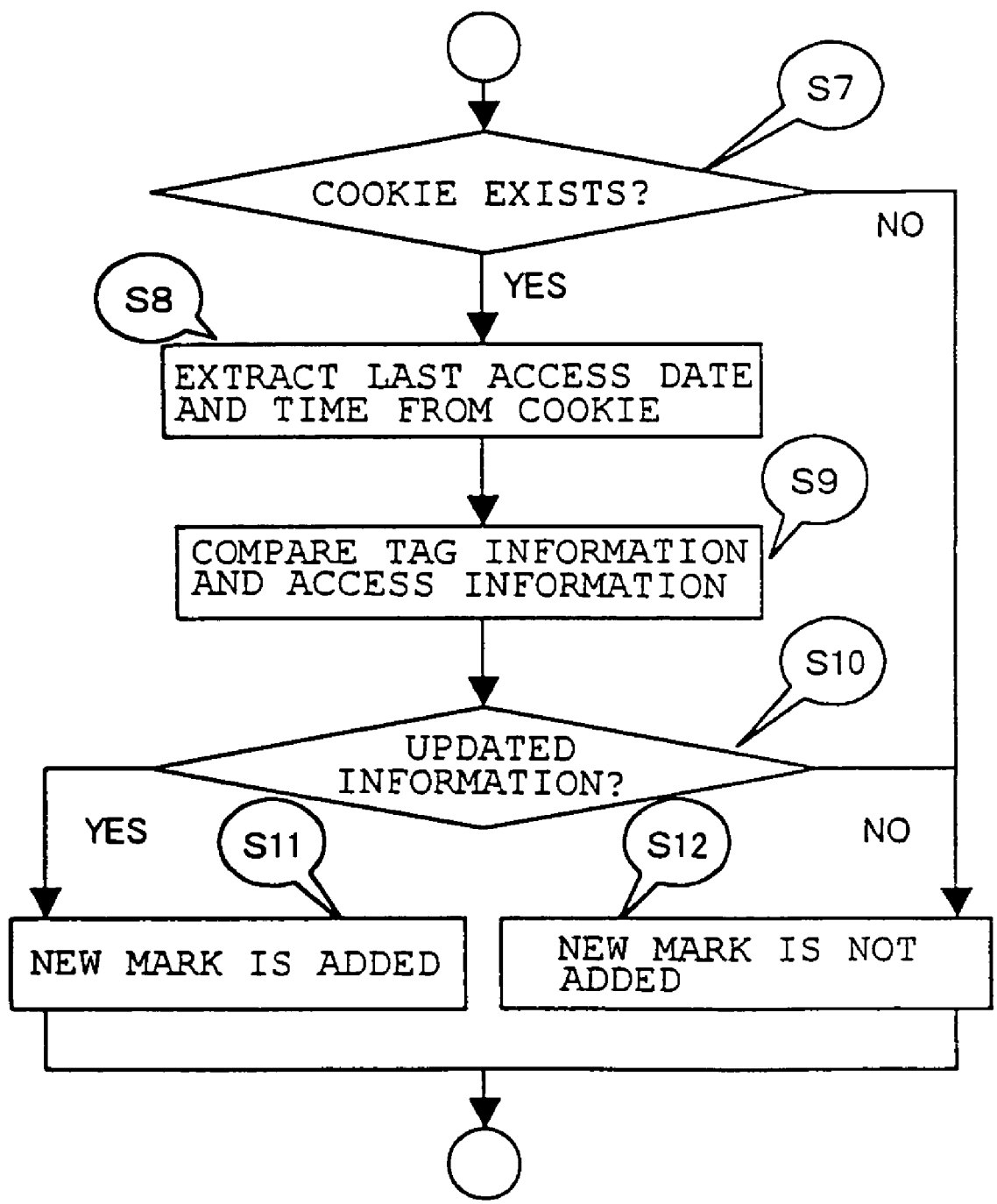
FIG. 3 is a processing flow diagram of an update determination program in the embodiment.

The Web server 7 having received the information transmission request 4 reads out the WWW document information 11 corresponding to the URL and starts up the tag analysis program 8. FIG. 2 shows processing procedures of the tag analysis program 8. The update determination program 9 is started up in the tag analysis program 8, and the Cookie information from the client terminal 1 and the WWW document information 11 of the Web server 7 are compared. More specifically, the comparison is a comparison between a final access date and time based on the Cookie information and individual update information of the WWW document information 11 as shown in FIG. 3. As a result of the comparison, tags are rewritten by the tag conversion program 10 for update information after the update date and time read out from the Cookie information.

Each of these programs will be described in detail.

FIG. 2 is a processing flow diagram of the tag analysis program 8.

In FIG. 2, step S1 is a step for detecting Cookie information, and whether or not Cookie information is added to the information transmission request 4 of the client is detected in this step.

The next step (S2) is the step for detecting a tag from the WWW document information 11 corresponding to the URL to which the information transmission request 4 is made, and is repeated until processing is completed for all the tags given to the WWW document information 11.

When a tag in the WWW document information 11 is detected, it is determined whether the tag is an update tag or not.

Here, a <NEW> tag is defined anew as the update tag in this embodiment. Two options can be designated in the <NEW> tag. A date and time (or date) when the information is updated is written in "update date and time" in a first option. An image file name such as a logo to be used as a "New mark" is written in "file name" of a second option. Specific display examples of the <NEW> tag are shown below.

"A : support information<NEW update="20000524" src=" . . . /image/new.gif">"

In this description, the update date and time option is the part of "update="20000524"", and the file name is the part of "src=" . . . image/new.gif"".

If the update tag is not like this, a general tag analysis processing step (S4) is executed, and the processing returns to step S2. The general tag processing in this context means processing for a character size and other formats.

When an update tag is extracted in step S3, the update determination program 9 is started up (S5), then the tag conversion program 10 is started up (S6), and conversion processing of the tag is performed.

FIG. 3 is a processing flow diagram of the update determination program 9. The update determination program 9 determines whether or not the "New mark" indicating that the Cookie information is new information for a browser (a user) should be added using the last access date and time obtained from the Cookie information and the information written in the update date and time option of the <NEW> tag.

In FIG. 3, if the Cookie information is added to the information transmission request 4 from the client terminal 1 in accordance with the determination result of the above-mentioned step of detecting the Cookie information (S1), the last date and time when the client terminal 1 accessed the URL indicating the location of the WWW document information of the Web server 7 is extracted from the Cookie information (steps S7 and S8).

Then, the information of the access date and time extracted as above and the update information given to respective information of the WWW document information 11 are compared (S9). As a result, if the information of the access date and time is determined to be updated information, the processing moves to step S11 and executes processing for adding the "New mark".

Figure 4:
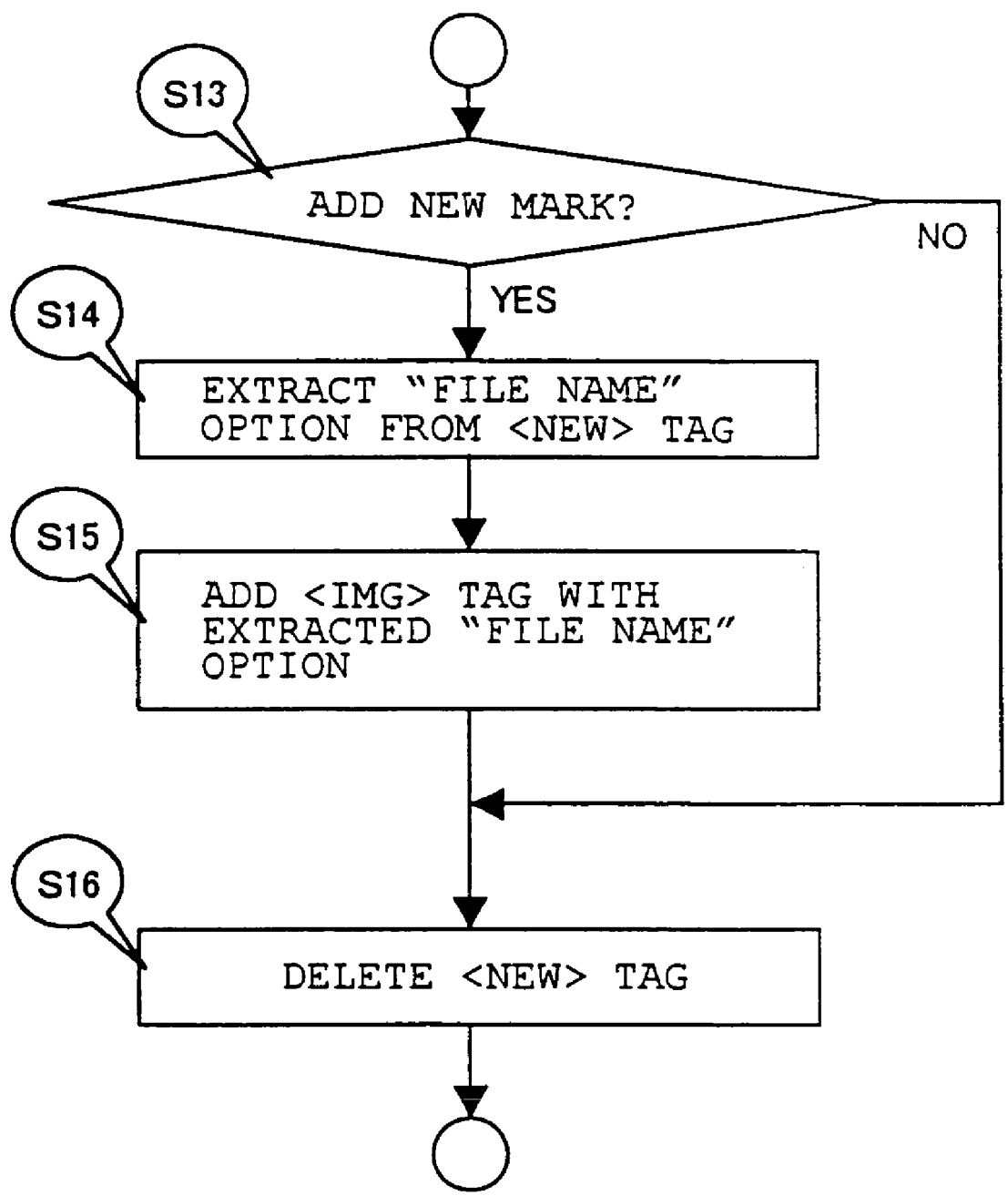
FIG. 4 is a processing flow diagram of a tag conversion program in the embodiment.

FIG. 4 is a processing flow diagram of the tag conversion program 10, and the processing is for converting the <NEW> tag and displaying the <NEW> tag correctly on the general-purpose browser program 2 on the client terminal 1.

In the above-mentioned step S11, when it is determined that the "New mark" is added (S13), the file name option is extracted from the <NEW> tag (S14). The file name option is the processing for extracting the description of "src=" . . . /image/new.gif"" explained in the above-mentioned concrete example.

Then, an <IMG> tag is generated based on the extracted file name option, and is added in the WWW document for transmission to the client terminal 1. More specifically, the above-mentioned description example is "A: support information <src=" . . . /image/new.gif'>". The <IMG> tag is apart to be displayed as an actual "New mark" in the browser program 2 of the client terminal 1.

The next step (S16) is processing for deleting the above-mentioned <NEW> tag. By deleting the <NEW> tag, only the converted <IMG> tag is transmitted to the client terminal 1. That is, processing for the <NEW> tag does not affect the client side at all because it completes in the server side, thus display control of new information becomes possible.

Figure 5:
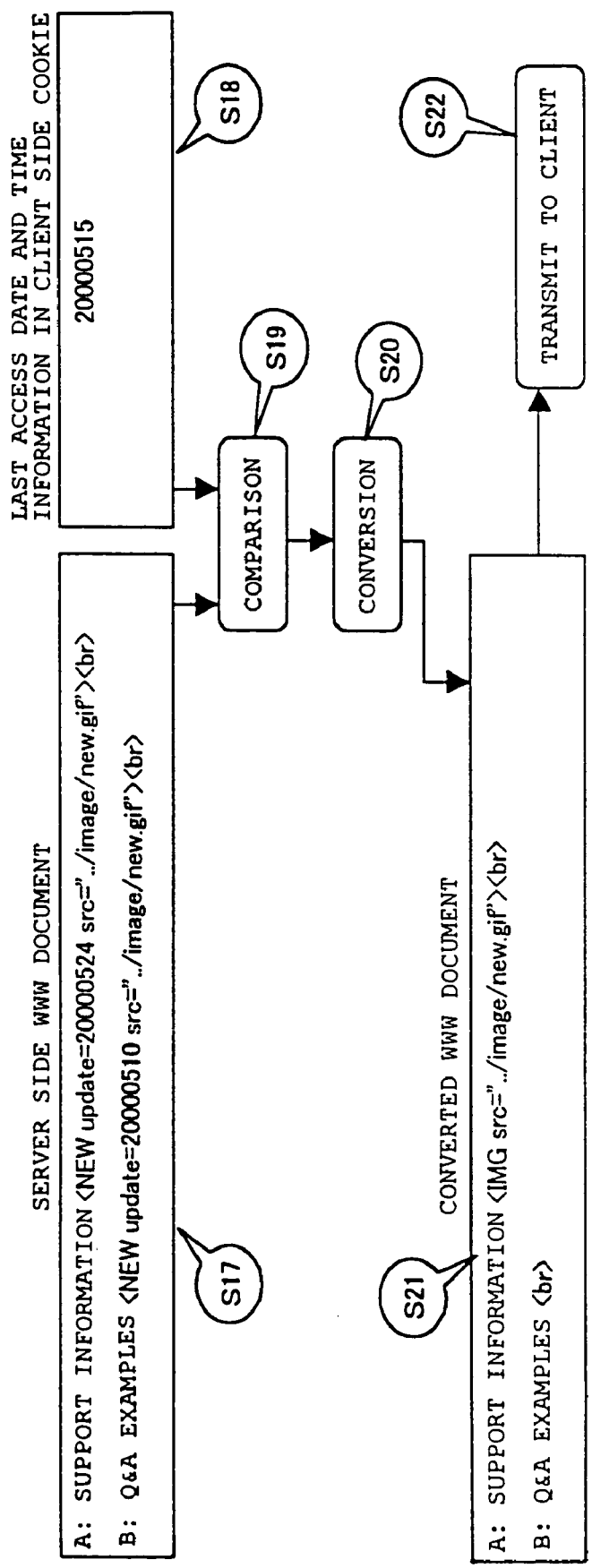
FIG. 5 is a processing flow diagram illustrating a specific example of comparison processing and conversion processing in the embodiment.

FIG. 5 is a processing flow diagram more specifically illustrating the processing described in FIGS. 2 through 4.

In FIG. 5, information A (support information) is information updated on May 24, 2000 and information B (Q&A examples) is information updated on May 10, 2000 in the WWW document accumulated in the Web server 7. The "NEW" tag is given to respective information, and the format of the tag is based on the above-mentioned rule.

On the other hand, the last access date and time information in the Cookie information attached to the information transmission request 4 from the client terminal 1 indicates "May 15, 2000". Therefore, the information A is absolutely new information for the client terminal 1, but the information B has already been seen in the previous access.

In the Web server 7, when the information transmission request 4 is received form the client terminal 1, it is determined whether or not Cookie information is included in the information transmission request 4 (steps S1 and S7 illustrated in FIGS. 2 and 3). If Cookie information exists, the last date and time when the client terminal 1 accessed the URL is read out from the Cookie information (S8, S18).

Then, the WWW document accumulated in the designated URL is read out, the tag analysis program 8 is started up, and the tag of the WWW document is analyzed (S2, S3, S17).

Here, when the <NEW> tag is extracted, the date and time information in the update date and time option of the <NEW> tag and the last access date and time information in the Cookie information are compared (S9, S19).

In the specific example of FIG. 5, the information A is the information updated after the last access, and the information B is the information that was already updated before the last access. Therefore, for a user operating the client terminal 1, the information A is new information but the information B is the information already read. The information A is thus determined to be information to which the "New mark" should be given, and the information B is determined to be information to which the "New mark" is not required to be given (S10 through S12).

Then, the tag conversion program 10 is started up (S20), steps S14 through S16 described in FIG. 4 are executed on the information A that is determined to be given the "New mark".

As a result, the WWW document is converted to a source file format shown in step S21 of FIG. 5, and is returned to the client terminal 1 as return information 6.

Figure 6:
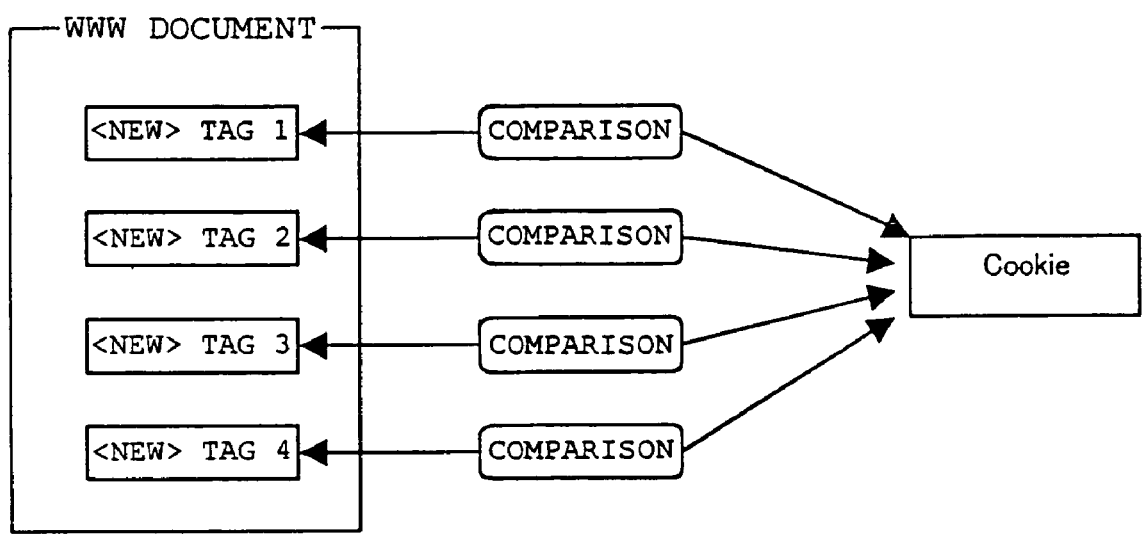
FIG. 6 is a conceptual diagram of comparison between <NEW> tags and Cookie information in the embodiment.

FIG. 6 is a conceptual diagram of comparison between <NEW> tags of the WWW document and the final access date and time information of the Cookie information in this embodiment.

As shown in FIG. 6, if a plurality of <NEW> tags exist in a single WWW document, the update determination processing and the tag conversion processing are repeated for each <NEW> tag. Although an "update date and time" that is an option of the <NEW> tag and the final access date and time information described in the Cookie information are required for the update determination processing, the Cookie information only has the update information of each WWW document (each page) and does not have information for "each tag". Therefore, the comparison processing is performed by comparing respective <NEW> tags in the document to the Cookie information (the last access date and time information) by the unit of a document in this embodiment.

Figure 7:
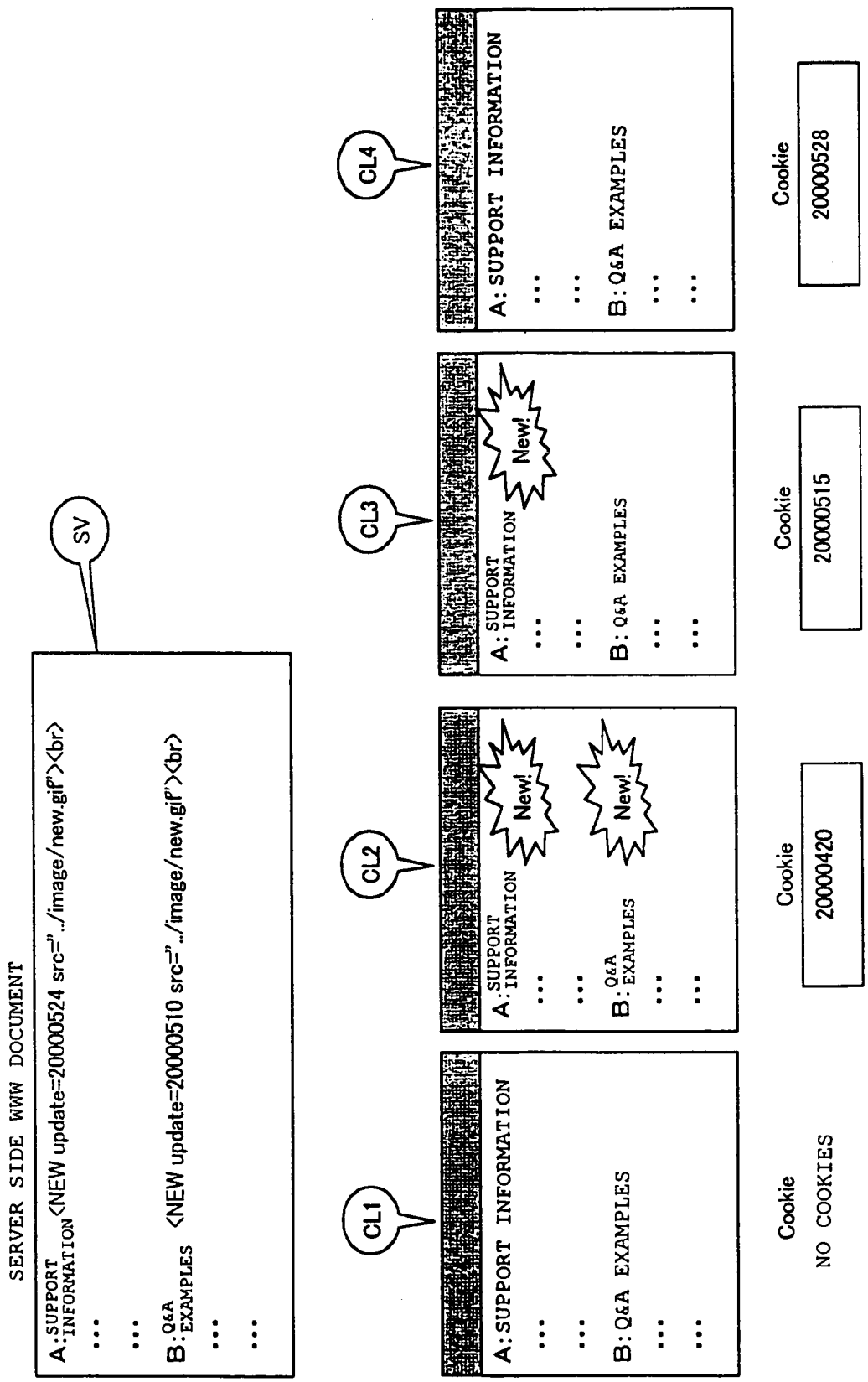
FIG. 7 is an explanatory illustration of an example of a server side document and display examples for each of client terminals CL1 through CL4.

FIG. 7 illustrates a state in which a WWW page is displayed in the browser program 2 of the client terminal 1. In FIG. 7, the <NEW> tags are described for each of the information A and the information B in the WWW document (SV) accumulated in the Web server 7.

The Cookie information for the URL of the WWW document is different in the browser program 2 of each of four client terminals (CL1 through CL4).

The client terminal CL1 shows a state in which the WWW document of the Web server 7 is accessed for the first time. Since the access is made in the state in which no Cookie information exists, all pieces of information are new and the "New mark" is not given to the information A and the information B.

The client terminal CL2 has Cookie information, and since the last access date and time based on the Cookie information is before the update date and time of both the information A and the information B, the "New mark" is given to both the information A and the information B.

The last access date and time of the client terminal CL3 is after the update of the information B and before the update of the information A. Therefore, the "New mark" is given to the information A that was updated after the last access, and displayed.

The last access date and time of the client terminal CL4 is after the update of the information A and the information B. Therefore, since the information A and the information B after update have already been seen (read) at the time of the last access time, the "New mark" is not given to either information.

The embodiment of the present invention has been described, but the present invention is not limited to this. For example, although the tag analysis program 8, the update determination program 9 and the tag conversion program 10 are described in the example in which they are installed in the Web server 7, each of the programs or functions corresponding to these programs may be given to a proxy server (not shown) that will be placed between the Web server 7 and the client terminal 1.

In addition, the update date and time option of the <NEW> tag and the last access date and time information of the Cookie information are described in the example in which these are directly compared (S8 through S10, S19), the tag is converted and the "New mark" is displayed. However, a resultant value of subtracting a fixed number of date and time from the date and time information of the Cookie information may be compared with the update date and time option of the <NEW> instead of directly comparing the update date time option and the last access date and time information. With such processing, even if the WWW document (SV) is accessed right after the information update, the "New mark" can be always displayed for the fixed number of dates (the subtracted date and time in the above).

More specifically, if the "New mark" is desired to be always displayed for ten days after information update in the server side, after extracting the last access date and time from the Cookie information of step S8, ten days are subtracted from the date and time.

In this way, in the case of the client terminal CL4 of FIG. 7, although the last access date and time obtained from the actual Cookie information is May 18, 2000, since ten days are subtracted from the date, date and time that is compared with the update date and time option of the <NEW> tag is May 18, 2000. Therefore, as a result of the date and time information after the processing and the update date and time option of the <NEW> tag being compared, the "New mark" is displayed on the information A for the client terminal CL4 even if the information has already been seen (read).

That is, concerning the support information A (the information updated on May 24), since ten days are subtracted from the last access date and time of the Cookie information, it is possible to always display the "New mark" for an access until June 3.

Moreover, by arranging the number of accesses for each URL to be registered in the Cookie information, whether or not the "New mark" is to be given may be determined depending on the number of accesses in steps S9 and S10.

Furthermore, although this embodiment is described in the case in which the "New mark" is not given as all pieces of information are new when it is determined in step S7 that the Cookie information does not exist, the present invention is not limited to this, and the "New mark" may be given to all the pieces of information and displayed.

Thus, it is seen that a method and apparatus for automatically updating information are provided. One skilled in the art will appreciate that the present invention can be practiced by other than the preferred embodiments which are presented for the purposes of illustration and not of limitation, and the present invention is limited only by the claims which follow.

What is claimed is:

1. An automatic display method for update information, comprising:
   receiving an information transmission request including an address and apparatus update information from a client apparatus, wherein said apparatus update information includes at least last access date from said client apparatus to said address;
   reading out server side document information including individual update information for each piece of individual information, wherein said individual update information includes at least a date when said each piece of individual information is last updated;
   extracting individual information that is updated after update of said apparatus update information by comparing at least last access date included in said apparatus update information and at least last updated date included in said individual update information;
   adding a display attribute to the extracted individual information; and
   editing the individual information to which a display attribute is added and returning the edited individual information to said client apparatus as document information for display,
   wherein said extracting said individual information further comprises:
   reading out the server side document information;
   analyzing whether or not a tag in the server side document information is an update tag having an update attribute;
   reading out, if the tag is an update tag, update date and time, or update date, included in the update tag as individual update information;
   comparing said update date and time, or said update date, with a last access date and time, or a last access date, with respect to said server side document information for each apparatus included in said apparatus update information; and
   extracting, as a result of said comparison, update information that is updated after the last access date and time or the last access date with respect to said server side document information.

2. An automatic display method for update information, comprising:
   receiving an information transmission request including an address and apparatus update information from a client apparatus, wherein said apparatus update information includes at least last access date from said client apparatus to said address;
   reading out server side document information including individual update information for each piece of individual information, wherein said individual update information includes at least a date when said each piece of individual information is last updated;
   extracting individual information that is updated after update of said apparatus update information by comparing at least last access date included in said apparatus update information and at least last updated date included in said individual update information;
   adding a display attribute to the extracted individual information; and
   editing the individual information to which a display attribute is added by deleting an update tag having an update attribute added to the server side document information, and adding a general-purpose displaying tag or displaying figure that is readable by the client apparatus and returning the edited individual information to said client apparatus as document information for display.

3. An automatic display method for update information, comprising:
   receiving an information transmission request including an address and apparatus update information from a client apparatus, wherein said apparatus update information includes at least last access date from said client apparatus to said address;
   reading out server side document information including individual update information for each piece of individual information, wherein said individual update information includes at least a date when said each piece of individual information is last updated;
   extracting individual information that is updated after update of said apparatus update information by comparing at least last access date included in said apparatus update information and at least last updated date included in said individual update information;
   adding a display attribute to the extracted individual information; and
   editing the individual information to which a display attribute is added and returning the edited individual information to said client apparatus as document information for display, wherein, if the apparatus update information does not exist in said information transmission request, only deletion of an update tag having an update attribute added to said server side document information is performed when editing said individual information, and the server side document information after the deletion is returned to said client apparatus as document information for display.

4. An automatic display method for update information, comprising:

receiving an information transmission request including an address and apparatus update information from a client apparatus, wherein said apparatus update information includes at least last access date from said client apparatus to said address;

reading out server side document information including individual update information for each piece of individual information, wherein said individual update information includes at least a date when said each piece of individual information is last updated;

extracting individual information that is updated after update of said apparatus update information by comparing at least last access date included in said apparatus update information and at least last updated date included in said individual update information;

adding a display attribute to the extracted individual information; and editing the individual information to which a display attribute is added and returning the edited individual information to said client apparatus as document information for display, wherein, if the apparatus update information does not exist in said information transmission request, processing of deleting an update tag having an update attribute added to the server side document information with respect to all pieces of individual information when editing said individual information and adding a general-purpose displaying tag or displaying figure that is readable by the client apparatus is performed.

5. An automatic display method for update information, comprising:

receiving an information transmission request including an address and apparatus update information from a client apparatus, wherein said apparatus update information includes at least last access date from said client apparatus to said address;

reading out server side document information including individual update information for each piece of individual information, wherein said individual update information includes at least a date when said each piece of individual information is last updated;

extracting individual information that is updated after update of said apparatus update information by adding a predetermined correction value to either said apparatus update information or said individual update information and comparing at least last access date included in said apparatus update information and at least last updated date included in said individual update information;

adding a display attribute to the extracted individual information; and editing the individual information to which a display attribute is added and returning the edited individual information to said client apparatus as document information for display.

6. The automatic display method for update information according to claim 5, wherein said predetermined correction value is the number of days.

7. The automatic display method for update information according to claim 5, wherein said predetermined correction value is the number of days, and a resultant value found by subtracting the predetermined number of days from said apparatus update information and the update date and time of said individual information are compared.

8. An information display apparatus, comprising:

a receiving unit receiving an information transmission request including an address and apparatus update information from a client apparatus, wherein said apparatus update information includes at least last access date from said client apparatus to said address;

a document information reading out unit reading out server side document information including individual update information for each piece of individual information, wherein said individual update information includes at least a date when said each piece of individual information is last updated;

an individual information extracting unit extracting individual information that is updated after update of said apparatus update information by comparing at least last access date included in said apparatus update information and at least last updated date include in said individual update information;

an adding unit adding a display attribute to the extracted individual information; and a returning unit editing the individual information to which a display attribute is added and returning the edited individual information to said client apparatus as document information for display, wherein said individual information extracting unit extracting said individual information further comprises:

an analyzing unit analyzing whether or not a tag in the readout server side document information is an update tag having an update attribute;

an individual update information reading out unit reading out, if the tag is an update tag, update date and time, or update date, included in the update tag as individual update information;

a comparing unit comparing said update date and time, or said update date, with a last access date and time, or a last access date, with respect to said server side document information for each apparatus included in said apparatus update information; and an update information extracting unit extracting, as a result of said comparison, update information that is updated after the last access date and time or the last access date with respect to said server side document information.

9. An information display apparatus, comprising:

a receiving unit receiving an information transmission request including an address and apparatus update information from a client apparatus, wherein said apparatus update information includes at least last access date from said client apparatus to said address;

a document information reading out unit reading out server side document information including individual update information for each piece of individual information, wherein said individual update information includes at least a date when said each piece of individual information is last updated;

an individual information extracting unit extracting individual information that is updated after update of said apparatus update information by comparing at least last access date included in said apparatus update information and at least last updated date include in said individual update information;

an adding unit adding a display attribute to the extracted individual information; and a returning unit editing the individual information to which a display attribute is added by deleting an update tag having an update attribute added to the server side document information and adding a general-purpose displaying tag or displaying figure that is readable by the client apparatus, and returning the edited individual information to said client apparatus as document information for display.

10. An information display apparatus, comprising:

a receiving unit receiving an information transmission request including an address and apparatus update information from a client apparatus, wherein said apparatus update information includes at least last access date from said client apparatus to said address;

a document information reading out unit reading out server side document information including individual update information for each piece of individual information, wherein said individual update information includes at least a date when said each piece of individual information is last updated;

an individual information extracting unit extracting individual information that is updated after update of said apparatus update information by comparing at least last access date included in said apparatus update information and at least last updated date include in said individual update information;

an adding unit adding a display attribute to the extracted individual information; and a returning unit editing the individual information to which a display attribute is added and returning the edited individual information to said client apparatus as document information for display, wherein, if the apparatus update information does not exist in said information transmission request, said adding unit performs only deletion of an update tag having an update attribute added to said server side document information when editing said individual information, and said returning unit returns the server side document information after the deletion to said client apparatus as document information for display.

11. An information display apparatus, comprising:

a receiving unit receiving an information transmission request including an address and apparatus update information from a client apparatus, wherein said apparatus update information includes at least last access date from said client apparatus to said address;

a document information reading out unit reading out server side document information including individual update information for each piece of individual information, wherein said individual update information includes at least a date when said each piece of individual information is last updated;

an individual information extracting unit extracting individual information that is updated after update of said apparatus update information by comparing at least last access date included in said apparatus update information and at least last updated date include in said individual update information;

an adding unit adding a display attribute to the extracted individual information; and a returning unit editing the individual information to which a display attribute is added and returning the edited individual information to said client apparatus as document information for display, wherein, if the apparatus update information does not exist in said information transmission request, said adding unit performs processing of deleting an update tag having an update attribute added to the server side document information with respect to all pieces of individual information when editing said individual information and adding a general-purpose displaying tag or displaying figure that is readable by the client apparatus.

12. An information display apparatus, comprising:

a receiving unit receiving an information transmission request including an address and apparatus update information from a client apparatus, wherein said apparatus update information includes at least last access date from said client apparatus to said address;

a document information reading out unit reading out server side document information including individual update information for each piece of individual information, wherein said individual update information includes at least a date when said each piece of individual information is last updated;

an individual information extracting unit extracting individual information that is updated after update of said apparatus update information by adding a predetermined correction value to either said apparatus update information or said individual update information and comparing at least last access date included in said apparatus update information and at least last updated date include in said individual update information;

an adding unit adding a display attribute to the extracted individual information; and a returning unit editing the individual information to which a display attribute is added and returning the edited individual information to said client apparatus as document information for display.

13. The information display apparatus according to claim 12, wherein said predetermined correction value is the number of days.

14. The information display apparatus according to claim 12, wherein said predetermined correction value is the number of days, and a resultant value found by subtracting the predetermined number of days from said apparatus update information and the update date and time of said individual information are compared.

15. A storage medium readable by a computer, comprising:

receiving an information transmission request including an address and apparatus update information from a client apparatus, wherein said apparatus update information includes at least last access date from said client apparatus to said address;

reading out server side document information including individual update information for each piece of individual information, wherein said individual update information includes at least a date when said each piece of individual information is last updated;

extracting individual information that is updated after update of said apparatus update information by comparing at least last access date included in said apparatus update information and at least last updated date included in said individual update information;

adding a display attribute to the extracted individual information; and editing the individual information to which a display attribute is added and returning the edited individual information to said client apparatus as document information for display, wherein said extracting said individual information further comprises:
reading out the server side document information;
analyzing whether or not a tag in the server side document information is an update tag having an update attribute;
reading out, if the tag is an update tag, update date and time, or update date, included in the update tag as individual update information;
comparing said update date and time, or said update date, with a last access date and time, or a last access date, with respect to said server side document information for each apparatus included in said apparatus update information; and
extracting, as a result of said comparison, update information that is updated after the last access date and time or the last access date with respect to said server side document information.

16. A storage medium readable by a computer, comprising:
receiving an information transmission request including an address and apparatus update information from a client apparatus, wherein said apparatus update information includes at least last access date from said client apparatus to said address;
reading out server side document information including individual update information for each piece of individual information, wherein said individual update information includes at least a date when said each piece of individual information is last updated;
extracting individual information that is updated after update of said apparatus update information by comparing at least last access date included in said apparatus update information and at least last updated date included in said individual update information;
adding a display attribute to the extracted individual information; and
editing the individual information to which a display attribute is added by deleting an update tag having an update attribute added to the server side document information and adding a general-purpose displaying tag or displaying figure that is readable by the client apparatus, and returning the edited individual information to said client apparatus as document information for display.

17. A storage medium readable by a computer, comprising:
receiving an information transmission request including an address and apparatus update information from a client apparatus, wherein said apparatus update information includes at least last access date from said client apparatus to said address;
reading out server side document information including individual update information for each piece of individual information, wherein said individual update information includes at least a date when said each piece of individual information is last updated;
extracting individual information that is undated after update of said apparatus update information by comparing at least last access date included in said apparatus update information and at least last undated date included in said individual update information;
adding a display attribute to the extracted individual information; and
editing the individual information to which a display attribute is added and returning the edited individual information to said client apparatus as document information for display, wherein, if the apparatus update information does not exist in said information transmission request, only deletion of update tag having an update attribute added to said server side document information is performed when editing said individual information, and the server side document information after the deletion is returned to said client apparatus as document information for display.

18. A storage medium readable by a computer, comprising:
receiving an information transmission request including an address and apparatus update information from a client apparatus, wherein said apparatus update information includes at least last access date from said client apparatus to said address;
reading out server side document information including individual update information for each piece of individual information, wherein said individual update information includes at least a date when said each piece of individual information is last updated;
extracting individual information that is updated after update of said apparatus update information by comparing at least last access date included in said apparatus update information and at least last updated date included in said individual update information;
adding a display attribute to the extracted individual information; and
editing the individual information to which a display attribute is added and returning the edited individual information to said client apparatus as document information for display, wherein, if the apparatus update information does not exist in said information transmission request, processing of deleting an update tag having an update attribute added to the server side document information with respect to all pieces of individual information when editing said individual information and adding a general-purpose displaying tag or displaying figure that is readable by the client apparatus is performed.

19. A storage medium readable by a computer, comprising:
receiving an information transmission request including an address and apparatus update information from a client apparatus, wherein said apparatus update information includes at least last access date from said client apparatus to said address;
reading out server side document information including individual update information for each piece of individual information, wherein said individual update information includes at least a date when said each piece of individual information is last updated;
extracting individual information that is updated after update of said apparatus update information by adding a predetermined correction value to either said apparatus update information or said individual update information and comparing at least last access date included in said apparatus update information and at least last updated date included in said individual update information;

adding a display attribute to the extracted individual information; and editing the individual information to which a display attribute is added and returning the edited individual information to said client apparatus as document information for display.

20. The storage medium readable by a computer according to claim 19, wherein said predetermined correction value is the number of days.

21. The storage medium readable by a computer according to claim 19, wherein said predetermined correction value is the number of days, and a resultant value found by subtracting the predetermined number of days from said apparatus update information and the update date and time of said individual information are compared.

\* \* \* \* \*

UNITED STATES PATENT AND TRADEMARK OFFICE
CERTIFICATE OF CORRECTION

PATENT NO. : 7,069,292 B2  
APPLICATION NO. : 09/764353  
DATED : June 27, 2006  
INVENTOR(S) : Yasuo Sugahara It is certified that error appears in the above-identified patent and that said Letters Patent is hereby corrected as shown below:

On Title Page item 56 Column 2 (Other Publications), Line 2, after "IBM" change "COPR." to --CORP.--.

Signed and Sealed this

Twelfth Day of December, 2006

JON W. DUDAS  
*Director of the United States Patent and Trademark Office*